United States Patent [19]

Anderson et al.

[11] 3,939,051
[45] Feb. 17, 1976

[54] PROCESS FOR ELECTRODEPOSITION OF CATIONIC THERMOSETTING COMPOSITIONS

[75] Inventors: Carl C. Anderson, Gibsonia; Joseph R. Marchetti, Greensburg, both of Pa.

[73] Assignee: PPG Industries, Inc., Pittsburgh, Pa.

[22] Filed: Aug. 2, 1971

[21] Appl. No.: 168,433

[52] U.S. Cl. ............................................. 204/181
[51] Int. Cl.$^2$ ........................................ C25D 13/06
[58] Field of Search .................................. 204/181

[56] References Cited
UNITED STATES PATENTS 3,679,564  7/1972  Dowbenko et al. ................. 204/181

Primary Examiner—Howard S. Williams
Attorney, Agent, or Firm—William J. Uhl

[57] ABSTRACT

This invention relates to cationic electrodepositable coating compositions comprising an aminoalkyl monomer, a reaction product comprising a half-blocked diisocyanate and an ethylenically unsaturated hydroxyl-containing monomer. Such compositions can be formulated in such a manner as to provide suitable coatings which when cured have a pleasing appearance, good flexibility, hardness, and resistance to the action of water and chemicals.

5 Claims, No Drawings

PROCESS FOR ELECTRODEPOSITION OF CATIONIC THERMOSETTING COMPOSITIONS

BACKGROUND OF THE INVENTION

The electrodeposition of coating compositions has become a fast growing industry. A wide variety of resinous compositions have been applied to obtain desirable results. The compositions utilized today may be either anionic in nature, that is, compositions which deposit at the anode, or cationic in nature, that is, compositions which deposit at the cathode. Many disadvantages have been encountered in employing anionic compositions, due in large part to their acidic nature; for example, anionic compositions tend to be sensitive to common types of corrosive attack, e.g., by salt, alkali, etc., and anionic deposition tends to place the uncured coating in proximity to metal ions evolved at the anode, thereby causing undesirable staining. Because of such undesirable characteristics there has been an increased interest in cationic compositions.

In the past it has been found that various amino monomers may be employed in the preparation of interpolymers which subsequently may be electrodeposited at the cathode to provide suitable coatings. See U.S. Pat. No. 3,454,482.

It is also known that aqueous compositions comprising acid-solubilized, imine-modified, carboxylic acid group-containing acrylic resins can be blended with a blocked isocyanate and subsequently deposited at the cathode, to provide suitable coating compositions, see U.S. Pat. application Ser. No. 47,860, filed June 19, 1970, now U.S. Pat. No. 3,679,564. Likewise, it is known that blends of blocked organic polyisocyanates with polyamide amine resins, i.e., Versamid 115, which is a condensation product of dimerized linoleic acid and diethylene triamine, can be electrodeposited at the cathode to produce coatings having highly desirable properties.

DESCRIPTION OF THE INVENTION

It has now been found that aqueous compositions comprising an interpolymer of (a) a secondary or tertiary nitrogen-containing aminoalkyl monomer; (b) a reaction product comprising a half-blocked diisocyanate and an ethylenically unsaturated hydroxyl functional monomer; and optionally (c) at least one other alpha, beta ethylenically unsaturated monomer, may be electrodeposited at the cathode to produce coatings with highly desirable properties, including pleasing appearance, flexibility, hardness and resistance to the action of water and chemicals such as alkali, salt, etc.

Such compositions may be deposited on any conductive substrate, including those commonly employed in the art, such as treated and untreated metals such as iron, steel, zinc, brass, tin, nickel, chromium, aluminum and the like. However, other substrates, such as paper impregnated with substances to render it conductive, may be employed, likewise, substrates having conductive primer may also be coated.

Generally, the coating compositions are reduced to the desired solids content with water. Although ordinary tap water may be utilized, it is preferred that deionized water be employed because possible bath contamination may result from the use of tap water.

The solids content of the coating composition is quite flexible and may vary from as low as 1 percent to as high as 25 percent or higher.

Likewise, the voltages employed may vary from as low as about 1 volt to as high as about 500 volts or higher. Voltages employed will depend on desired film thickness, bath temperature, added adjuvants, bath conductivity and the like.

The cationic electrodepositable interpolymer for this invention may generally be described as comprising (a) from about 5 to about 50 percent by weight of a secondary or tertiary nitrogen-containing aminoalkyl monomer, but preferably from about 10 percent to about 15 percent by weight; (b) from about 5 percent to about 50 percent by weight of a reaction product comprising a half-blocked diisocyanate and an ethylenically unsaturated hydroxyl functional monomer; and optionally (c) from about 0 percent to about 90 percent at least one other alpha, beta ethylenically unsaturated monomer.

The aminoalkyl monomers are generally ethylenically unsaturated and may include acrylate and/or methacrylate esters having from 1 to 6 carbon atoms in the alkyl radical, such as the aminoethyl, aminopropyl, and aminohexyl esters; mono-N,N-di ($C_1$-$C_4$ alkylamino) - ($C_1$-$C_6$ alkyl) esters, such as mono - (N,N-dimethylamino) ethyl ester, mono - (N,N-dimethylamino) ethyl ester and mono - (N,N-dimethylamino) - hexyl ester. Also useful are monocyclic or bicyclic compounds having a five-membered to six-membered heterocycle containing one to three, preferably one to two heteroatoms, and should have at least one basic nitrogen atom and one heteroatom which is a nitrogen atom bearing a vinyl group. The basic nitrogen atom and the nitrogen atom bearing a vinyl group may be one which is a nitrogen atom bearing a vinyl group. The basic nitrogen atom and the nitrogen atom bearing a vinyl group may be one and the same group. Particularly suitable monocyclic or bicyclic compounds are those which contain no heteratoms other than nitrogen and for the rest consist of hydrocarbon radicals having not more than twenty carbon atoms. Examples of useful monocyclic compounds are N-vinylpyrazole, N-vinylimidazole, N-vinylimidazoline, N-vinylpiperidine and analogous compounds which bear methyl, ethyl or propyl groups as substituents on carbon atoms in the ring. Examples of suitable bicyclic compounds are N-vinylindole and its lower C-alkyl and C-alkoxy analogues.

Generally, any unsaturated secondary or tertiary nitorgen-containing monomer may be employed, for example those wherein the vinyl group is attached to radicals such as pyrrolyl, imidazlyl, pyrazolyl, pyridyl, pyrazinyl, pyrimidinyl and the like and where substituted substituents may include aliphatic (alkyl), alicyclic, aromatic (aryl), aromatic-substituted aliphatic (aralkyl) or heterocyclic groups.

Also, in some instances, unsaturated primary aminos may be useful. However, for pusposes of this invention monomers such as N,N-dimethylaminoethyl methacrylate N-vinylimidazole and the like are preferred.

As mentioned above, the reaction products employed is comprised of a half-blocked diisocyanate and an ethylenically unsaturated hydroxyl functional monomer.

The diisocyanate which is reacted with the ethylenically unsaturated compounds containing hydroxyl groups may be essentially any organic diisocyanate, such as hydrocarbon diisocyanates or substituted hydrocarbon diisocyanates, aromatic, aliphatic and cycloaliphatic diisocyanates, and combinations of these types. Representative compounds include 2,4-toluene diisocyanate, p-phenylene diisocyanate, 4-chloro-1,3-phenylene diisocyanate, 4,4'-diphenylene diisocyanate, 1,5-napthalene diisocyanate, 1,4-tetramethylene diisocyanate, 1,6-hexamethylene diisocyanate, 1,10-decylmethylene diisocyanate, 1,4-cyclohexylene diisocyanate, 4,4'-methylenebis(cyclohexyl isocyanate) and 1,5-tetrahydronapthylene diisocyanate. Compounds such as 2,4-toluene diisocyanate in which the two isocyanate groups differ in reactivity are particularly desirable as is isophorone diisocyanate. The diisocyanate may contain other substituents although those which are free from reactive groups other than the two isocyanate groups are ordinarily preferred. In the case of the aromatic compounds, the isocyanate groups may be attached either to the same or to different rings.

Most diisocyanates generally have the formula OCNR$_1$NCO wherein R$_1$ is selected from the group consisting of arylene, such as p-phenylene, diphenylene, and the like; alkarylene, such as toluene diphenylene, and the like; alkylene such as dimethylbiphenylene, and the like; alkylene, such as tetramethylene, hexamethylene, trimethyhexylene, and the like; aralalkylene, such as methylenebisphenyl, dimethylmethylenebisphenylene; and alicyclic such as isophorone, methylcyclohexylene, and the like.

The preferred diisocyanates in this invention are isophorone diisocyanate, toluene diisocyanate and hydrogenated toluene diisocyanate.

Examples of ethylenically unsaturated monomers containing hydroxyl groups which may be used are mono or polyhydroxyalkyl maleates, such as hydroxyethyl butyl maleate, hydroxypropyl maleate, and the like; mono or polyhydroxy alkyl fumarates, such as hydroxyethyl butyl fumarate, etc.; hydroxy-containing acrylates, such as trimethylolpropane mono-methacrylate, diethylene glycol monoacrylate, and N-methyl-N-2-hydroxyethylaminoethyl acrylate; hydroxy-containing itaconates such as hydroxyethyl itaconate, hydroxybutyl itaconate, and the like; hydroxy-containing vinyl compounds such as hydroxyethyl vinyl ether, trimethylolpropane monovinyl ether, and the like; and hydroxyalkyl acrylates, such as hydroxyethyl acrylate, hydroxypropyl acrylate, hydroxyethyl methacrylate, and the like.

The preferred ethylenically unsaturated compounds containing hydroxyl groups are hydroxyethyl acrylate and hydroxyethyl methacrylate.

Listed below are some examples of the structures of the various diisocyanates, hydroxyl-containing monomers and the reaction products produced from the said diisocyanates and hydroxyl monomers. As disclosed below the diisocyanate may be reacted with the hydroxyl monomer initially and subsequently blocked or visa versa, i.e., blocked first and then reacted with the hydroxyl monomer.

Some examples of reactants and the compounds formed are listed below:

| | Diisocyanate | OH Containing Compound |
|---|---|---|
| 1. | 1-methyl-2,4-diisocyanatocyclohexane (NCO groups at 2,4; CH$_3$ at 1) | HC—COO—CH$_2$CH(CH$_3$)—OH <br> ‖ <br> HC—COOCH$_2$CH$_2$CH$_2$CH$_3$ |
| 2. | Isophorone diisocyanate (trimethyl cyclohexane with NCO and CH$_2$NCO substituents) | CH—COO—CH(OH)—CH$_2$ <br> ‖ <br> CH—COOCH$_2$CH$_2$CH$_2$CH$_3$ |
| 3. | 4-chloro-1,3-phenylene diisocyanate | HC—COO—C(H$_2$)—C(H$_2$)—OH <br> ‖ <br> HC—COO—C(H$_2$)—C(H$_2$)—OH |
| 4. | OCN—(C$_6$H$_{10}$)—(C$_6$H$_{10}$)—NCO (4,4'-methylenebis(cyclohexyl isocyanate) type) | CH—COO—C(H$_2$)—C(H$_2$)—OH <br> ‖ <br> CH$_3$CH$_2$CH$_2$OOC—CH |
| 5. | 1,5-naphthalene diisocyanate | CH$_2$=CH—COO—C(H$_2$)—C(H$_2$)—OH |
| 6. | OCN—CH$_2$—C(CH$_3$)$_2$—CH$_2$—CH(CH$_3$)—CH$_2$—CH$_2$—NCO | H$_2$C=CH—COO—CH$_2$—C(CH$_2$OH)(CH$_2$OH)—CH$_2$CH$_3$ |

-continued

| Product | |
|---|---|
| 1. | HC—COOCH$_2$CH(CH$_3$)—O—C(=O)—N(H)—[cyclohexyl(CH$_3$)(NCO)] ; HC—COO—C$_4$H$_9$ |
| 2. | [neopentyl-type triol triester] with CH—COO—CH—CH$_2$—O—C(=O)—NH—CH$_2$—[cyclohexyl(CH$_3$)$_2$(NCO)(CH$_3$)] groups; CH—COO—C$_4$H$_9$ |
| 3. | CH—COO—CH$_2$CH$_2$—O—CO—NH—[C$_6$H$_3$(Cl)(NCO)] ; CH$_2$—COO—CH$_2$—CH$_2$—O—CO—NH—[C$_6$H$_3$(Cl)(NCO)] |
| 4. | CH—COO—CH$_2$—CH$_2$—O—CO—NH—[C$_6$H$_{10}$—C$_6$H$_{10}$—NCO] ; C$_3$H$_7$—OCO—CH |
| 5. | CH$_2$=CH—COO—CH$_2$CH$_2$—O—CO—NH—[naphthyl—NCO] |
| 6. | CH$_2$=CH—COO—CH$_2$—C(C$_2$H$_5$)[CH$_2$O—CO—NH—CH$_2$—C(CH$_3$)$_2$—CH$_2$—CH(CH$_3$)—CH$_2$—CH$_2$—NCO]$_2$ |

Some examples of reactants and the compounds formed are listed below:

| Diisocyanate | OH Containing Compound |
|---|---|
| 1. [4-methyl-1,3-diisocyanato-cyclohexane] | HC—COO—CH$_2$CH(CH$_3$)—OH ; HC—COOCH$_2$CH$_2$CH$_2$CH$_3$ |
| 2. [isophorone diisocyanate: (CH$_3$)$_2$, CH$_3$, CH$_2$NCO, NCO substituted cyclohexane] | CH—COO—CH(OH)—CH$_2$(OH) ; CH—COOCH$_2$CH$_2$CH$_2$CH$_3$ |

-continued
| | | | |
|---|---|---|---|
| 3. | 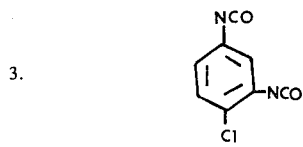 | | 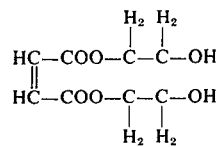 |
| 4. | 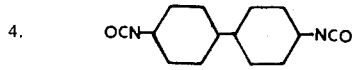 | | 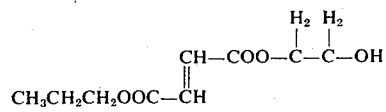 |
| 5. | 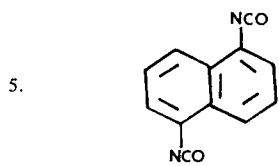 | | 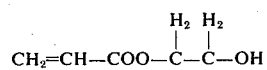 |
| 6. | 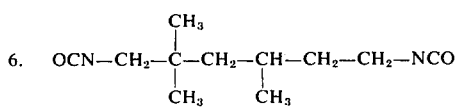 | | 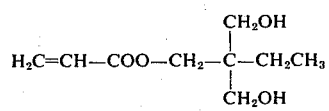 |
Product
1. 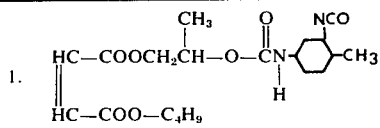
2. 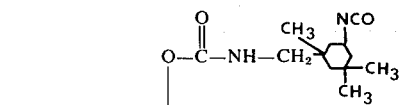
3. 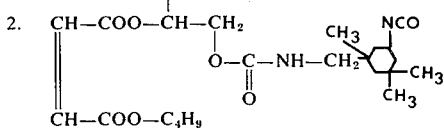
4. 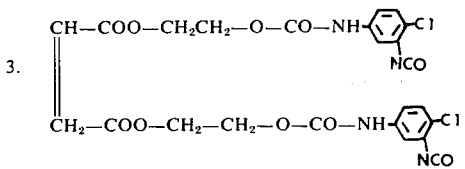
5. 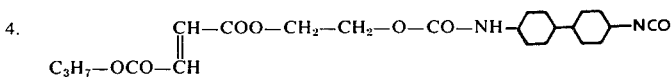

-continued

| | Diisocyanate | OH Containing Compound |
|---|---|---|
| 6. | $CH_2=CH-COO-CH_2-\underset{\underset{CH_2-O-CO-NH-CH_2-\underset{CH_3}{\overset{CH_3}{C}}-CH_2-\underset{CH_3}{\overset{}{CH}}-CH_2-CH_2-NCO}{\overset{CH_2-O-CO-NH-CH_2-\underset{CH_3}{\overset{CH_3}{C}}-CH_2-\underset{CH_3}{\overset{}{CH}}-CH_2-CH_2-NCO}{C}}}{C_2H_5}$ | |

| | Diisocyanate | OH Containing Compound |
|---|---|---|
| 7. | $OCN-CH_2CH_2CH_2CH_2CH_2CH_2-NCO$ | $H_2C=CH-COO-\underset{H_2}{\overset{H_2}{C}}-\underset{H_2}{\overset{H_2}{C}}-O-\underset{H_2}{\overset{H_2}{C}}-\underset{H_2}{\overset{H_2}{C}}-OH$ |
| 8. | $OCN-(CH_2)_{10}-NCO$ | $CH_2=CH-COO-\underset{H_2}{\overset{H_2}{C}}-\underset{H_2}{\overset{H_2}{C}}-\underset{CH_3}{\overset{}{N}}-CH_2-CH_2OH$ |
| 9. | 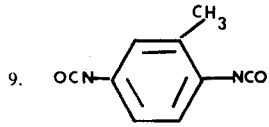 | $CH_2=\underset{H_2C-COO-CH_2CH_2OH}{\overset{C-COOCH_2CH_2OH}{\overset{|}{}}}$ |
| 10. | 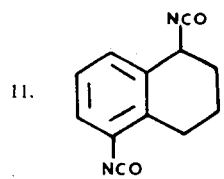 | $H_2C=\underset{CH_2-COOCH_2CH_2CH_3}{\overset{C-COO-CH_2CH_2CH_2CH_2OH}{\overset{|}{}}}$ |
| 11. | 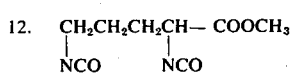 | $H_2C=CH-O-CH_2-CH_2OH$ |
| 12. | $\underset{NCO}{\overset{}{CH_2CH_2CH_2CH-}}\underset{NCO}{\overset{}{COOCH_3}}$ | $H_2C=CH-O-CH_2-\underset{\underset{CH_2OH}{\overset{CH_2OH}{\overset{|}{C}}}}{\overset{|}{C}}-CH_2CH_3$ |

| | Product |
|---|---|
| 7. | $CH_2=CHCOOCH_2CH_2-O-CH_2CH_2-O-CO-NH-CH_2CH_2CH_2CH_2CH_2CH_2NCO$ |
| 8. | $CH_2=CH-COO-CH_2-CH_2-\underset{CH_3}{\overset{}{N}}-CH_2-CH_2-O-CO-NH-(CH_2)_{10}-NCO$ |
| 9. | 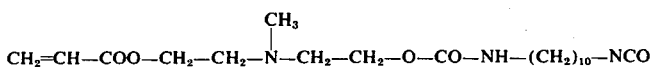 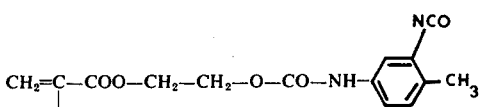 |
| 10. | $CH_2=\underset{CH_2-COO-C_4H_9}{\overset{C-COO-C_4H_8-O-CO-NH-}{\overset{|}{}}}$ 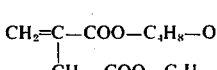 |

-continued

Product

11. CH₂=CH—O—CH₂—CH₂—O—CO—NH
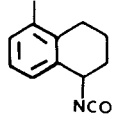
NCO

12. 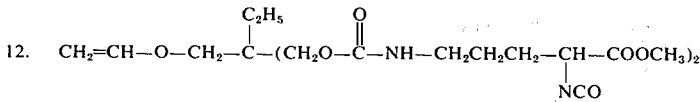

The equivalence ratio of the polymerizable monoethylenically unsaturated compound having hydroxyl groups to the diisocyanate may be varied but is generally from about 0.10:1 to about 0.55:1. The preferred ratio, however, is about 0.3:1 to 0.5:1.

The reaction is generally carried out at temperatures from about 0°C. to about 150°C. and preferably from about 15° to about 25°C. The reaction products produced are generally blocked with a blocking agent as described below.

The blocking reaction is sometimes run in the presence of a catalyst, generally when aliphatic diisocyanates are used. Examples of catalysts which may be used are dibutyl tin diacetate, triethylenediamine, N-methyl morpholine, triethylamine, stannous chloride, dimethyl tin dichloride, and the like. The catalyst present usually comprises less than 2 percent by weight of the reactants.

In many cases, a free-radical inhibitor is also used to prevent the reactants from premature polymerization. Any free-radical inhibitor may be utilized such as hydroquinone, methylquinone, methylhydroquinone, p-methoxyphenol, and the like. The inhibitor, if present, comprises from about 0.01 percent to about 5 percent by weight of the reactants.

The blocked reaction product obtained can be interpolymerized with an aminoalkyl monomer and one or more interpolymerizable ethylenically unsaturated monomers and the resulting interpolymers may then be electrodeposited at the cathode and, subsequently cured.

A common method of producing the novel polymers of this invention comprises reacting the polymerizable ethylenically unsaturated compounds containing hydroxyl groups with the diisocyanate as described above and subsequently reacting the product with an isocyanate blocking agent to block the remaining isocyanate group.

The isocyanate blocking agents used are well known in the art. Typical blocking agents are phenols, and thiols, tertiary alcohols, secondary aromatic amines, and 1,3-dicarbonyl compounds, and aliphatic or aromatic alcohols such as butanol, phenol, ethanol, m-cresol, 2-methyl-2-propanol, p-chlorophenol, 1-dodecanethiol, benzenethiol, and the like, and other materials such as ethyl acetoacetate and diethyl malonate and e-caprolactam and ethyl carbamate and boric acid. Other materials such as ketoxime may also be used. (See *The Chemistry of Organic Film Formers* by D. H. Solomon, John Wiley & Sons, 1967, page 207).

The isocyanate blocking agents that are preferred in this invention are alcohols. The alcohol generally has the formula R₈OH wherein R₈ is selected from the group consisting essentially of alkyl such as methyl, ethyl, butyl, and the like, cycloalkyl, such as cyclohexyl, cycloocytyl, and the like. Aryls such as phenyl, and the like, nitrogen-containing alcohols such as acetone ketoxime, cyclohexanone ketoxime, and the like.

The blocking agent may be added in any quantity. However, the blocking agent to diisocyanate-monomer reaction product equivalence ratio is generally equal to or greater than 1:1.

The reaction temperature and conditions for this reaction are similar to those used to react the diisocyanate with the ethylenically unsaturated monomer containing the hydroxyl groups. The resulting products of this method may then be interpolymerized with aminoalkyl monomers and other alpha, beta ethylenically unsaturated monomers to provide useful polymers.

A preferred method of preparing the novel interpolymers of this invention is to react a diisocyanate first with the alcohol and then react the product with the ethylenically unsaturated monomer-containing hydroxyl groups. The product is then interpolymerized with other aminoalkyl and optionally other copolymerizable ethylenically unsaturated monomers, to provide useful polymers.

The ethylenically unsaturated monomeric materials which may be interpolymerized with the reaction products of the above reactions to form useful interpolymers may be any monomer containing a CH₂=C< group including among the useful monomers possessing the CH₂=C< grouping are:

1. mono-olefinic hydrocarbons, that is, monomers containing only atoms of hydrogen and carbon, such as styrene, alpha-methylstyrene, alpha-ethylstyrene, alpha-butylstyrene, vinyltoluene, t-butylstyrene, and the like;

2. halogenated mono-olefinic hydrocarbons, that is, monomers, containing carbon, hydrogen, and one or more halogen atoms such as alpha-chlorostyrene, alpha-bromostyrene, 2,5-dichlorostyrene, 2,5-dibromostyrene, 3,4-dichlorostyrene, 3,4-difulorostyrene, ortho-, meta-, and parafluorostyrenes, 2,6-dichlorostyrene, 2,6-dibromostyrene, 2,6-difluorostyrene, 3-fluoro-4-chlorostyrene, 3-chloro-4-fluorostyrene, 2,4,6-trichlorostyrene, and dichloromonofluorostyrenes;

3. esters of organic and inorganic acids such as vinyl acetate, vinyl propionate, vinyl butyrate, vinyl isobutyrate, vinyl valerate, vinyl caproate, vinyl enanthate, vinyl benzoate, vinyl toluate, vinyl Versatate, vinyl p-chlorobenzoate, vinyl o-chlorobenzate, vinyl m-chlorobenzoate and similar vinyl halobenzoates, vinyl p-methoxybenzoate, vinyl o-methoxybenzoate, vinyl p-ethoxybenzoate, methyl methacrylate, ethyl methacrylate, propyl methacrylate, butyl methacrylate, amyl methacrylate, hexyl methacrylate, heptyl methacrylate, octyl methacrylate, decyl methacrylate, methyl crotonate, ethyl crotonate and ethyl tiglate;

methyl acrylate, ethyl acrylate, propyl acrylate, isopropyl acrylate, butyl acrylate, isobutyl acrylate, amyl acrylate, hexyl acrylate, 2-ethylhexyl acrylate, heptyl acrylate, octyl acrylate, 3,5,5-trimethylhexyl acrylate, decyl acrylate and dodecyl acrylate;

isopropenyl acetate, isopropenyl propionate, isopropenyl butyrate, isopropenyl isobutyrate, isopropenyl valerate, isopropenyl caproate, isopropenyl enanthate, isopropenyl benzoate, isopropenyl p-chlorobenzoate, isopropenyl o-chlorobenzoate, isopropenyl o-bromobenzoate, isopropenyl m-chlorobenzoate, isopropenyl toluate, isopropenyl alpha-chloroacetate and isopropenyl alpha-bromopropionate;

vinyl alpha-chloroacetate, vinyl alpha-bromoacetate, vinyl alpha-chloropropionate, vinyl alpha-bromopripionate, vinyl alpha-iodopropionate, vinyl alpha-chlorobutyrate, vinyl alpha-chlorovalerate and vinyl alpha-bromovalerate;

allyl chloride, allyl cyanide, allyl bromide, allyl fluoride, allyl iodide, allyl chlorocarbonate, allyl thiocyanate, allyl formate, allyl acetate, allyl propionate, allyl butyrate, allyl valerate, allyl caproate, allyl 3,5,5-trimethylhexoate, allyl benzoate, allyl chloracetate, allyl trichloroacetate, allyl chloropropionate, allyl chlorovalerate, allyl pyruvate, allyl acetoacetate, as well as methallyl esters corresponding to the above allyl esters as well as esters from such alkenyl alcohols as beta-ethyl allyl alcohol, beta-propyl allyl alcohol, 1-butene-4-ol, 2-methyl-butene-ol-4,2(2,2-dimethylpropyl)-1-butene-4-ol and 1-pentene-4-ol;

methyl alpha-chloroacrylate, methyl alpha-bromoacrylate, methyl alpha-fluoracrylate, methyl alpha-iodoacrylate, ethyl alpha-chloroacrylate, propyl alpha-chloroacrylate, isopropyl alpha-bromoacrylate, amyl alpha-chloroacrylate, octyl alpha-chloroacrylate, 3,5,5-trimethylhexyl alpha-chloroacrylate, decyl alpha-chloroacrylate, methyl alpha-cyano acrylate, ethyl alpha-cyano acrylate, amyl alpha-cyano acrylate and decyl alpha-cyano acrylate;

dimethyl maleate, diethyl maleate, dimethyl fumarate, diethyl fumarate, dimethallyl fumarate and diethyl glutaconate;

4. organic nitriles such as acrylonitrile, methacrylonitrile, ethacrylonitrile, 3-octenentrile, crotonitrile, oleonitrile, methylene glutaronitrile, and the like;

5. acid monomers such as acrylic acid, methacrylic acid, crotonic acid, 3-butenoic acid, agnelic acid, tiglic acid, and the like.

6. monomeric ketones such as isopropenyl methyl ketone, vinyl methyl ketone, and the like.

In general, it is preferred that the monomer utilized contain a single $CH_2$=C< group in terminal position, which group is activated by a negative substituent, and an especially preferred group of monomers includes ethyl acrylate, methyl methacrylate, butyl acrylate, ethylhexyl acrylate, styrene, and monomethylstyrenes.

The co-monomers may also contain hydroxy groups such as hydroxyalkyl acrylate, acrylic acid, etc. It is also noted that the co-monomers may be present during the formation of the reaction product and the resulting mixture may then be interpolymerized.

The interpolymerization of the monomers formed by the reaction methods described above and other ethylenically unsaturated monomers are most readily carried out in a solvent in which the monomers are soluble at reaction temperature and under reflux temperature. Various suitable solvents are toluene, xylene, higher boiling aromatic compounds; esters such as cellosolve acetate, isobutyl isobutyrate, and the like.

In carrying out the polymerization reaction a peroxygen type catalyst is ordinarily utilized. Useful catalysts for this purpose include acetyl benzoyl peroxide, hydroxyheptyl peroxide, methyl ethyl ketone peroxide, cyclohexanone peroxide, cyclohexyl hydroperoxide, 2,4-dichlorobenzoyl peroxide, cumene hydroperoxide, dicumyl peroxide, t-butyl hydroperoxide, methyl amyl ketone peroxide, acetyl peroxide, lauroyl peroxide, benzoyl peroxide, methyl cyclohexyl hydroperoxide, p-chlorobenzoyl peroxide, di-t-butyl peroxide, peracetic acid, t-butyl permaleic acid, di-t-butyl diperphthalate, t-butyl perphthalic acid, t-butyl peracetate, and the like. It has been found that two of the most economical of the above peroxygen compounds are entirely satisfactory in most instances; for example, cumene hydroperoxide can be used advantageously at higher reflux temperatures, whereas benzoyl peroxide has been very effective at lower reflux temperatures. For some polymerization reactions, mixtures of the above peroxygen compounds are used to secure desired conversions. The diazo compounds such as alpha-alpha-azo-di-isobutyronitrile or p-methoxyphenyl diazothio-(2-napthyl) ether, may also be used as polymerization catalysts in the preparation of the unsaturated polymerizable amide interpolymers. Redox catalyst systems can also be employed.

The quantity of catalyst employed can be varied considerably; however, in most instances it is desirable to utilize from about 0.1 percent to 5.0 percent by weight of the monomeric components. If high viscosities are desired, a low initial level of catalyst, followed by the necessary addition to get 100 percent conversion, is preferably employed. For low viscosity interpolymers the bulk of the catalyst is added initially and later additions used only to secure desired conversions. Larger amounts of catalyst added initially give lower viscosities.

Since it is desirable that the interpolymers of the monomers of this invention with other ethylenically unsaturated monomers be relatively low in molecular weight so that they can be dissolved at high solids and low viscosities, a chain-modifying agent or chain terminator is ordinarily added to the polymerization mixture. It is preferred to add controlled amounts of chain-modifying materials. The mercaptans, such as dodecyl mercaptan, tertiary dodecyl mercaptan, octyl mercaptan, hexyl mercaptan, and the like, are conventionally used for this purpose. However, other chain-modifying agents such as cyclopentadiene, allyl acetate, allyl carbamate, alpha-methylstyrene dimers, and alpha-methylstyrene itself can be used to secure low molecular weights, as can unsaturated fatty acids or esters. Aromatic hydrocarbons in the reaction mixture also are of assistance in maintaining low molecular weight.

The polymerization is best carried out by admixing the monomers of this invention and the other monomer or monomers, the catalyst and chain-modifying agent, if any, in the solvent, and refluxing the resulting solution for a time sufficient to obtain the desired conversion. Ordinarily, the polymerization time will be from about 1 hour to about 16 hours. As indicated hereinabove, it may in some instances be desirable to add only a portion of the catalyst initially, the remainder being added in increments as the polymerization progresses. External cooling of the polymerization mixture or very accurate control of reflux conditions is important in carrying out the polymerization because of the very rapid reaction rate. Good agitation is also desirable because it is important that the product has a non-gelled composition.

The interpolymers are derived from about 2 to about 99 percent by weight of the monomers formed from the preparations listed above.

The interpolymers described hereinabove are readily suitable to formulate the coating compositions of this invention.

The interpolymers of this invention are solubilized or neutralized with an acid to provide compositions dispersed in an aqueous medium for use in electrodeposition. Electrodepositable compositions, while referred to as "solubilized", are considered a complex solution, dispersion or suspension or combination of one or more of these classes, in water, which acts as an electrolyte under influence of an electric current. The interpolymer which is the vehicle resin is in solution or a dispersion, which may be called a molecular dispersion, of molecular size between a colloidal suspension and a true solution.

Generally, the interpolymers of this invention are solubilized with a suitable acid having pka from about 0.1 to about 5.0.

Examples of inorganic acids that are useful include active acids such as hydrochloric, chloric, perchloric, hydrobromic, bromic, hydriodic, nitric, sulfuric, and the like; moderately active acid such as nitrous, sulfurous, oxalic, phosphoric, hydrochlorous, and the like; slightly active acids such as acetic, carbonic, hydrofluoric, hydrosulfuric, hydrocyanic, and the like.

Examples of suitable organic acids include aliphatic monocarboxylic acids such as formic, acetic, propionic, butyric, isobutyric, trans-crotonic, chloroacetic, trichloroacetic, bromoacetic, iodoacetic, glycolic, cyanoacetic, furoic, 2-thiophenecarboxylic, and the like; aromatic monocarboxylic acids such as benzoic, o-toluic, m-toluic, p-toluic, α-naphthoic, β-naphthoic, phenylacetic, trans-cinnamic, o-chlorobenzoic, p-chlorobenzoic, p-nitrobenzoic, m-hydroxybenzoic, anisic, gallic, p-aminobenzoic, di- and tricarboxylic acids such as oxalic, malonic, succinic, adipic, trans-fumaric, maleic, malic, citric, o-phthalic, o-phenylenediacetic, malonic, alutaric, pimelic, suberic, azelaic, sebacic, tricarballylic, and the like; and substituted aliphatic carboxylic acids such as glycolic, lactic, tartronic, tartaric, saccharic, glyoxylic, acetoacetic, levulinic, and the like.

The amount of solubilizing acid employed to neutralize the interpolymer is also somewhat flexible, for example, an acid sufficient to protonate from about 25 to about 200 percent of the amino containing groups of the herein-above-described interpolymer can successfully be employed. However, the preferred degree of neutralization is from about 75 to about 150 percent, as it has been found that more stable cathodic coating compositions can be obtained at these levels of neutralization.

Preceding, following, or during neutralization of the interpolymer, a crosslinking agent may be added, if desired. Preferably, the crosslinking agent is acid catalyzed and heat curable. The amount of crosslinking agent employed usually is from about 5 to about 30 percent of the total vehicle solids, although more or less can be used in some instances. Examples of such crosslinking agents include amine resins, epoxy resins, phenolic resins, hydroxyl-terminated polyester, and the like.

When the interpolymers of this invention are applied to suitable substrates, they may be cured at elevated temperatures, such as from 250°F. to about 600°F. At these high temperatures, it is believed that blocking agent is split from the isocyanate group, freeing the isocyanato groups to react with the amino groups or other reactive groups introduced by the incorporation of crosslinking agents. The blocking agent may either volatilize or remain in the composition as a plasticizer, depending essentially on its boiling point.

In many instances, the dispersed compositions may be pigmented in desired proportions of most conventional type pigments, for example, iron oxide, lead oxide, carbon black, titanium dioxide, talc, barium sulfate, as well as color pigments such as cadmium red, phthalocyanine blue, toluidine red, chromic yellow, and the like. Various other additives that may be utilized include antioxidants, surface-active agents, fungicides, bactericides, wetting agents, anti-foaming agents, and the like. Listed below are examples of the interpolymers and the cationic coating compositions produced from the same. These examples are not to be construed as limiting the invention to their details. All parts and percentages in the examples, as well as throughout this specification, are by weight unless otherwise specified.

EXAMPLE I

Into a reactor equipped with condenser, stirrer, thermometer, and dropping funnel there were charged 290.0 parts of ethyl Cellosolve and 106.0 parts of butyl Cellosolve and heated to 120–130°C. and held. There was then added to the reactor over a period of 3 hours a mixture of 580.0 parts butyl acrylate, 350.0 parts styrene, 140.0 parts N,N-dimethylaminoethyl methacrylate, 58.0 parts 2-hydroxyethyl methacrylate, 210.0 parts reaction product (below) and 17.0 parts alpha,alpha-azobisisobutyronitrile. A mixture of 2.0 parts t-butylperoxyisopropyl carbonate and 4.5 parts ethyl Cellosolve were added. The reaction was held at 120°C. for one hour, after which a second addition of said components was added and, likewise, the reaction was permitted to continue for one hour, after which a third and final addition of said components was added and the reaction was permitted to continue for 2 hours. The interpolymer produced had the following characteristics:

| | |
|---|---|
| Solid content (percent) | 73.5 |
| Acid number | 2.95 |
| Viscosity (Brookefield viscometer) | |
| No. 7 spindle, 20 r.p.m.) | 87,000 cps. |

Reaction Product

The reaction product employed in the above interpolymer was produced in the following manner: A reaction vessel was charged with 870.0 parts 2,4-toluene diisocyanate. The vessel temperature was maintained at about 20°C. by means of an ice bath as 651.0 parts of 2-ethylhexanol were added over about 3 hours. The ice bath was then removed and the temperature was permitted to rise to about 30°C. About 0.75 parts of dibutyl tin dilaurate were added to the vessel and 580.0 parts of 2-hydroxyethyl acrylate were added over a 2 hour period while the temperature was maintained at about 30°C. After the addition was complete, the reaction was permitted to continue for an hour. The reaction product was reduced with 300.0 parts ethyl Cellosolve and 0.5 part of an inhibitor (p-methoxyphenol) were added.

The interpolymer (above) was 100 percent neutralized with gluconic acid and catalyzed with 2 percent, based on weight of interpolymer solids, of dibutyl tin dilaurate. When reduced to about 10 percent solids content with deionized water, the coating composition had a pH of 4.0. When electrodeposited at 200 volts for 90 seconds on phosphatized steel panels, the coating films produced had excellent appearance (smooth) and good pencil hardness (HB). This coating composition produced excellent films even when said composition was allowed to stand in open air, without agitation, for one month, thus demonstrating a desirable characteristic of electrodepositable compositions, stability.

EXAMPLE II

The interpolymer produced in this Example was similar to that produced in Example I except 290.0 parts of styrene, 87.0 parts dimethyl aminoethyl methacrylate and 315.0 parts of reaction product (below) were employed instead of the amounts stated in Example I.

The interpolymer produced had the following characteristics:

| | |
|---|---|
| Solids content | 74.3 |
| Acid number | 5.0 |
| Viscosity (Brookfield Viscometer No. 7 spindle, 20 r.p.m.) | |

The reaction product employed in this interpolymer comprises 870.0 parts 2,4-toluene diisocyanate, 641 parts 2-ethylhexanol, 116.0 parts 2-hydroxyethyl acrylate, and about 3 drops of dibutyl tin dilaurate.

The above interpolymer was employed in formulating a pigment paste (below).

Pigment Paste

| | Parts by Weight |
|---|---|
| Interpolymer (above) | 118.5 |
| Gluconic acid | 21.3 |
| Titanium dioxide | 344.0 |
| Deionized water | 226.2 |

The paste was ground by conventional means and was subsequently employed in formulating an electrodepositable coating composition (below).

Coating Composition

| | |
|---|---|
| Interpolymer (above) | 354.0 |
| Gluconic acid | 64.4 |
| Pigment paste (above) | 171.0 |
| Deionized water | 3010.6 |

Films produced on steel panels by electrodepositing at 300 volts for 90 seconds and baking for 20 minutes at 400°F. had excellent appearance and displayed fairly good salt spray resistance after having been subjected to salt spray fog for 168 hours.

EXAMPLE III

This example was similar to that of Example II except that Example III contained dispersed in the coating composition 5.5 parts of dibutyl tin dilaurate. Then said coating composition was electrodeposited on steel panels at 200 volts and baked for 20 minutes at 400°F. Likewise, this coating composition provided for films having good appearance, fairly poor resistance to salt spray fog and excellent detergent resistance (General Electric's Test Method E50LB11).

Below are listed examples of some other interpolymers of this invention that may readily be formulated in such a manner that when electrodeposited they provide suitable coatings for many purposes.

EXAMPLE IV

This example is similar to that of Example II except that in Example IV the reaction product was comprised of 621.0 parts of isophorone diisocyanate, 390 parts 2-ethylhexanol, and 348.0 parts 2-hydroxyethyl acrylate.

EXAMPLE V

Into a reactor as in Example I there was charged 290.0 parts ethyl Cellosolve and 106.0 parts butyl Cellosolve and the said charge was heated to about 120°C. Then there was added to the reactor over a period of 3 hours a mixture of 580.0 parts butyl acrylate, 350.0 parts styrene, 58.0 parts 2-hydroxyethyl acrylate, 210.0 parts reaction product (below) and 17.0 alpha, alpha-azobisisobutyronitrile. A mixture was added over a three hour period while reactor contents refluxed profusely, the said mixture comprised 140.0 parts N,N-dimethylaminoethyl methacrylate, 245.0 parts gluconic acid (50 percent in water), and 50.0 parts ethyl Cellosolve. After this addition three separate additions, each of 2.0 parts t-butylperoxyisopropyl carbonate and 4.5 parts ethyl Cellosolve, were added at time intervals similar to that in the interpolymer of Example I.

The interpolymer produced had the following characteristics:

| | |
|---|---|
| Solids content (percent) | 66.9 |
| Acid number | 18.6 |
| Viscosity (Brookfield Viscometer No. 7 spindle, 20 r.p.m.) | 52,000 cps. |

The reaction product utilized in the above interpolymer comprised 696.0 parts 2,4-toluene diisocyanate, 116.0 parts 2-ethylhexanol, 521.0 parts 2-hydroxyethyl acrylate, and 3 drops dibutyl tin dilaurate.

EXAMPLE VI

This example was produced in a manner similar to that of Example V, however, instead of employing N,N-dimethylaminoethyl methacrylate, 562.0 parts of a dimethyl sulfate salt of N,N-dimethylaminoethyl methacrylate, which is sold commercially by Alcolac Chemical Corporation under the tradename of Sipomer Q-5) was used along with gluconic acid. Also, alpha, alpha-azobisisobutyronitrile was employed instead of t-butylperoxyisopropyl carbonate in the catalyst solution addition. The reaction product employed was the same as that in Example I. The interpolymer produced had a total solids content of 42.8 percent and an acid number of 3.35.

EXAMPLE VII

This example was similar to Example V except acetic acid was employed instead of gluconic acid.

The interpolymer produced had the following characteristics:

| | |
|---|---|
| Solids content (percent) | 72.3 |
| Acid number | 21.5 |
| Viscosity (Brookfield Viscometer, No. 7 spindle, 20 r.p.m.) | |

EXAMPLE VIII

This example was similar to that of Example VI except that the aminoalkyl monomer comprised 210.0 parts 2-isopropenyl-4-ethyl-4-hydroxymethyl-2-oxanyoline and in addition to the 17.0 parts of alpha,alpha-azobisisobutyronitrile, 10.0 parts of t-butyl-peroxyisopropyl carbonate were employed.

Examples IV through VII may be readily formulated into an aqueous coating composition which may be unpigmented or pigmented with a paste similar to that utilized in Example II.

When formulating coating compositions in many instances, it may be desirable to include crosslinking agents or co-curing resins to provide a particular characteristic. The amounts of these agents and/or resins usually vary from about 5 to about 30 percent based on total resin solids, although more or less may be employed if desirable. Examples of such agents and resins include amine resins, epoxy resins, phenolic resins, isocyanates, hydroxyl-terminated polyesters and the like. The preferred crosslinking agents include condensation products of formaldehyde with melamine, urea or benzoguanamine.

Various pigment combinations are likewise possible. When employing the interpolymers of this invention for special coating compositions, other pigments such as talc, barium sulfate, cadmium red, chromic yellow and the like may be utilized to replace or may be employed in addition to titanium dioxide as employed in Example II.

In addition to the above-enumerated substitutions and combinations, various other additives may be included in the formulation of the electrodepositable composition. Other additives include fungicides, wetting agents, anti-oxidants and the like which are commonly known and available in the art.

According to the provisions of the Patent Statutes, there are described above the invention and what are now considered its best embodiments; however, within the scope of the appended claims, it is to be understood that the invention can be practiced otherwise than as specifically described.

We claim:

1. A method of coating an electrically-conductive substrate which comprises passing electric current between an anode and a cathode in contact with an aqueous coating composition comprising an interpolymer of:
   a. from about 5 to about 50 percent by weight of a secondary or tertiary nitrogen-containing aminoalkyl monomer;
   b. from about 5 to about 80 percent by weight of reaction product comprising a half-blocked diisocyanate and an unsaturated hydroxyl-containing monomer; and
   c. from about 0 to about 90 percent by weight of at least one ethylenically unsaturated monomer.

2. The method of claim 1 wherein the nitrogen-containing aminoalkyl monomer is selected from a member of the class consisting of N,N-dimethylaminoethyl methacrylate, N-vinylimidozole and a sulfate salt of N,N-dimethylaminoethyl methacrylate.

3. The method of claim 1 wherein the diisocyanate is selected from a member of the class consisting of toluene diisocyanate, isophorone diisocyanate and hydrogenated toluene diisocyanate.

4. The method of claim 1 wherein the unsaturated hydroxyl-containing monomer is selected from a member of the class consisting of hydroxyethyl acrylate, hydroxypropyl methacrylate, and hydroxyethyl methacrylate.

5. The method of claim 1 wherein the ethylenically unsaturated monomer is selected from a member of the class consisting of butyl acrylate, ethyl acrylate, methyl methacrylate, ethylhexyl acrylate, and styrene.

* * * * *